No. 808,415. PATENTED DEC. 26, 1905.
J. B. WHITNEY.
TENSION DEVICE FOR WINDING MECHANISMS.
APPLICATION FILED OCT. 26, 1903.

2 SHEETS—SHEET 1.

WITNESSES:
W. D. Bell.
Robert J. Pollitt.

INVENTOR,
Joseph B. Whitney.
BY
Arthur T. Steward
ATTORNEYS.

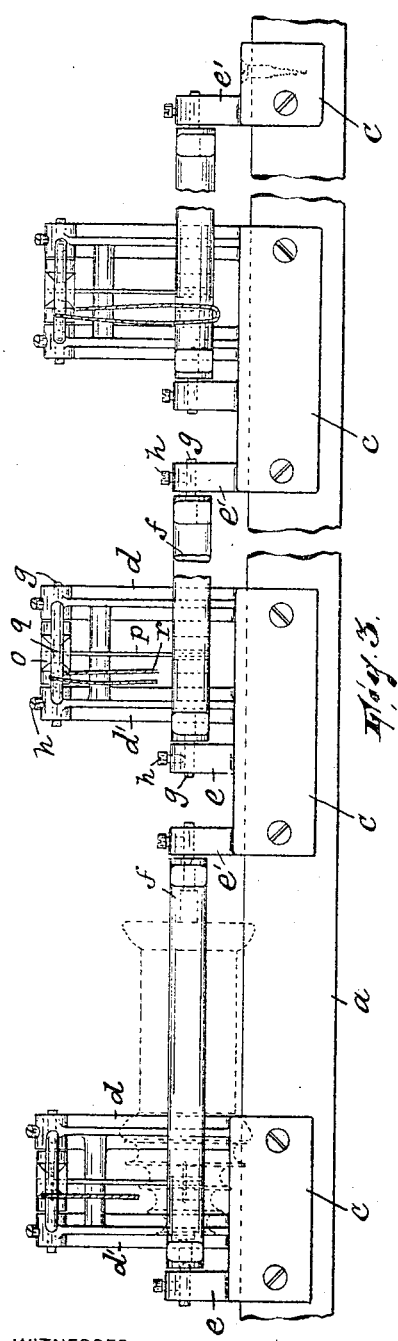
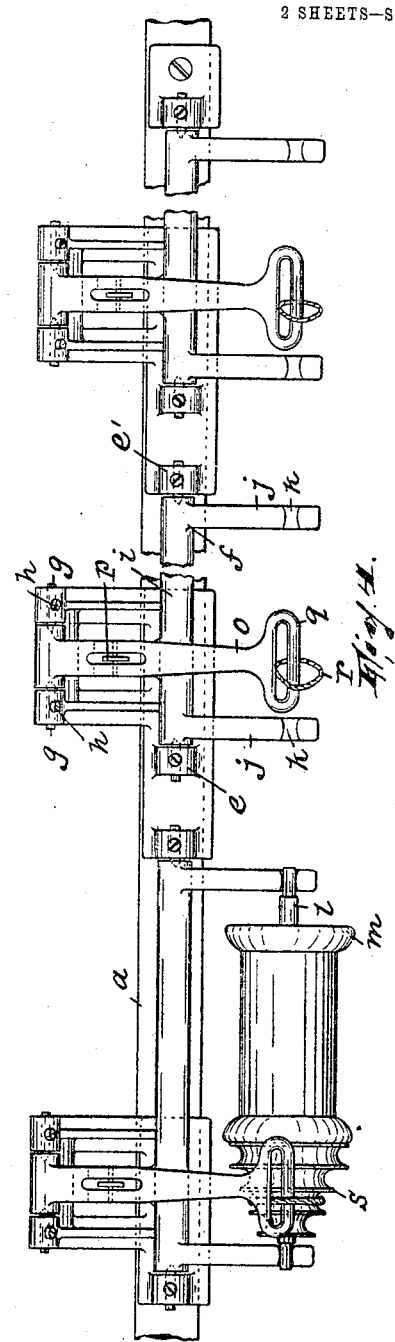

UNITED STATES PATENT OFFICE.

JOSEPH B. WHITNEY, OF NEW YORK, N. Y.

TENSION DEVICE FOR WINDING MECHANISMS.

No. 808,415.  Specification of Letters Patent.  Patented Dec. 26, 1905.

Application filed October 26, 1903. Serial No. 178,472.

*To all whom it may concern:*

Be it known that I, JOSEPH B. WHITNEY, a citizen of the United States, residing in the borough of Brooklyn, in the city of New York, county of Kings, and State of New York, have invented certain new and useful Improvements in Tension Devices for Winding Mechanisms; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My present invention relates to thread-winding mechanism or the like; and it has reference particularly to means for neutralizing the tendency toward change of tension on the material being operated upon, which grows out of the fact that a winding or unwinding spool or similar part changes in diameter as the thread winds on or is unwound from it.

Broadly, my invention is applicable to any mechanism of substantially the nature of that above indicated where the spools, be they supply or receiving spools, are arranged horizontally. It contemplates applying to the spool a brake acting to exert more or less friction thereon according as the action of gravity on the spool alters as the winding or unwinding proceeds and the weight of the thread on the spool subsequently changes. To this end the spool is arranged to move substantially vertically, so as to be affected by the action of gravity, and means is employed for transmitting the effect of the dropping action of the spool to the braking device, such means being preferably, as shown and described herein, (though not essentially,) a lever system.

My invention in practical use will be found to bring about uniformity in tension where such would otherwise be wanting on account of varying conditions in the amount of material on the spool and whatever the rapidity with which the winding proceeds and whether the spool is winding or unwinding.

For the purposes of demonstration I have illustrated my invention in connection with a machine for winding quills.

Figure 1:
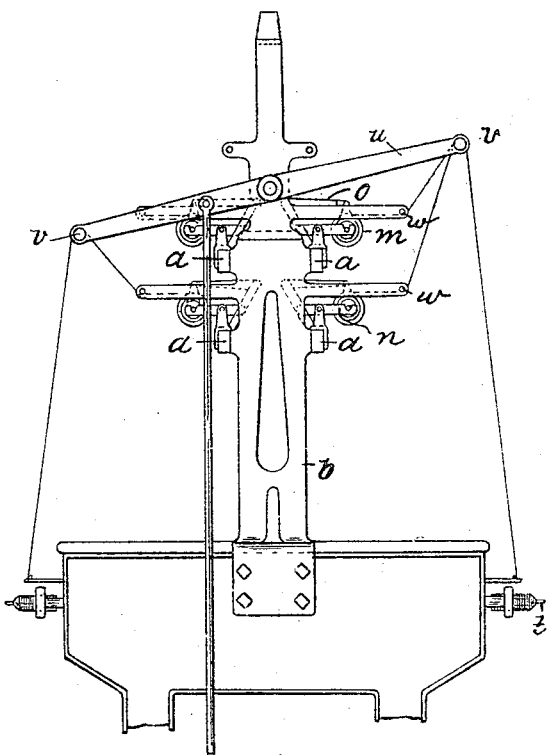
Figure 2:
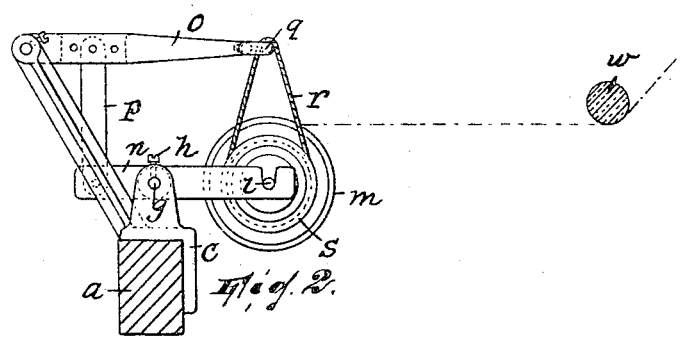

In the accompanying drawings, Figure 1 shows in side elevation my invention applied to a quilling-machine, only a portion of which latter is illustrated. Fig. 2 is a view in side elevation of the preferred form of the invention. Fig. 3 is an enlarged view, in front elevation, of a portion of the machine shown in Fig. 1, illustrating how a group of the mechanisms constituting my invention are assembled in a quilling-machine; and Fig. 4 is a top plan view of substantially what is seen in Fig. 3.

That particular adaptation of my invention which is shown in the drawings may be described as follows: On each rail $a$ of the frame $b$ of the winding-machine shown in Fig. 1 is arranged a series of brackets $c$. These brackets, which are the sustaining means for certain movable parts hereinafter described, are substantially alike throughout the series with the exception of the end ones, which are differently constructed, as hereinafter described. Each of the several brackets $c$, except the end brackets, is formed with two pairs of uprights $d\ d'$ and $e\ e'$, the former being slightly inclined rearwardly, while the latter stand vertical. In each upright $e$ and the adjoining upright $e'$ of the next adjacent bracket is fulcrumed a spool-support $f$. Pins $g$, having tapered points and arranged in said uprights $e\ e'$, serve as bearings for the support $f$, being adjustably held in place by set-screws $h$. Each support $f$ comprises a body portion $i$ and two parallel forwardly-projecting arms $j$, which are notched, as at $k$, to receive the spindle $l$ of the spool $m$. The support has another and rearwardly-projecting arm $n$ extending in between the uprights $d\ d'$.

$o$ is a lever which is fulcrumed at its rear end in the uprights $d\ d'$, the pins $g$ and adjusting-screws $h$ therefor being here also used as the fulcrum of this lever. The lever is pivotally connected with the arm $n$ of the support $f$ by a link $p$.

The front end of the lever $o$ is formed with a transversely-extending loop $q$. Through this loop extends an endless brake-band $r$, which passes around one of a series of graduated pulleys $s$, fixed on the spindle $l$. Upon a view to the foregoing it will be seen that the parts being arranged as shown in the drawings the weight of the spool acts to raise arm $n$ of support $f$ and so elevate, through link $p$, lever $o$, which latter in turn acts to draw upwardly on the brake-band and cause the latter to frictionally retard the rotation of the spindle $l$ and the spool it carries. Moreover, it will be apparent that as the supply of material on the spool diminishes so the weight of the spool varies, and so, also, the frictional retardation varies, being more or less, respectively, as the weight of the spool and material standing thereon is more or less.

The end brackets are preferably made different from the others in that one of them has only the upright e and the two uprights d d,' while the other has simply the upright e'.

The quilling-machine illustrated in Fig. 1 is of a familiar type. It will be understood that in the case of a machine of this character the spools will be delivering-spools, properly-operated quills t being adapted to be filled with thread supplied from the spools in a well-known manner. It is provided with a rocking frame u, carrying glass bars v, over which the threads extend, said frame acting to compensate for variations in tension growing out of differences in diameter of the conical portions of the cops on the quills t. In any case a thread-guiding means such as the glass bars w (shown in Figs. 1 and 2) ought by preference to be arranged with reference to each spool so that the portion of the thread between said guiding means and the spool will be approximately in a line tangent to said spool, which is at right angles to the line of up-and-down movement of the spool. Thus the pull of the thread will be directed on the spools in such manner as not to interfere with the action of gravity thereon.

Having thus fully described my invention, what I claim as new, and desire to secure by Letters Patent, is—

1. The combination, with a suitable sustaining means and a rotary thread-holding device arranged to move up and down, of means, carried by said sustaining means and actuated from said device by the action of gravity on the latter, for retarding the rotation of said device, substantially as described.

2. The combination, with a suitable sustaining means and a rotary thread-holding device arranged to move up and down, of means, carried by said sustaining means and actuated from said device by the action of gravity on the latter, for retarding the rotation of said device, said means comprising a lever system, substantially as described.

3. The combination, with a suitable sustaining means and a rotary thread-holding device arranged to move up and down, of means, carried by said sustaining means and actuated from said device by the action of gravity on the latter, for retarding the rotation of said device, said means comprising a continuous band frictionally engaging said device, substantially as described.

4. The combination, with a suitable sustaining means and a rotary thread-holding device arranged to move up and down, of a support for said device pivotally arranged in said sustaining means, a lever also pivotally arranged in said sustaining means, a link operatively connecting said lever and the support, and a band connecting the lever and said rotary device and frictionally engaging the latter, substantially as described.

5. The combination, with a suitable sustaining means and a rotary thread-holding device arranged to move up and down, of a support fulcrumed between its ends in said sustaining means, said device being carried by one end of said support, a lever fulcrumed in said support at one end and having its other end disposed approximately over said device, and a link pivotally connected to said lever between its ends and to the end of said support remote from said device, substantially as described.

6. The combination, with a suitable sustaining means and a rotary thread-holding device arranged to move up and down, of means, carried by said sustaining means and actuated from said device by the action of gravity on the latter, for retarding the rotation of said device, and a thread-guide arranged substantially in a tangent to said device which is at right angles to the line of movement of said device, substantially as described.

7. In a quilling-machine, the combination, with a suitable sustaining means, of a rotary device holding a supply of material to be wound on the quill and arranged to move up and down, means actuated from said device by the action of gravity on the latter, for retarding the rotation of said device, and a rocking frame carrying a glass bar, the thread being adapted to extend over said bar on its way from said device to the quill, substantially as described.

In testimony that I claim the foregoing I have hereunto set my hand this 23d day of October, 1903.

JOSEPH B. WHITNEY.

Witnesses:
JOHN W. STEWARD,
ROBERT J. POLLITT.